United States Patent
De Conto et al.

(10) Patent No.: US 9,637,220 B2
(45) Date of Patent: May 2, 2017

(54) SUPPORTING SET FOR A WING FLAP SYSTEM OF AN AIRCRAFT

(71) Applicant: Airbus Operations (S.A.S.), Toulouse (FR)

(72) Inventors: Sébastien De Conto, Bretx (FR); Fabrice Rival, Mons (FR); Romain Bernes, Toulouse (FR); Frédéric Coll, Bessens (FR)

(73) Assignee: Airbus Operations (S.A.S.), Toulouse (FR)

( * ) Notice: Subject to any disclaimer, the term of this patent is extended or adjusted under 35 U.S.C. 154(b) by 35 days.

(21) Appl. No.: 14/661,144

(22) Filed: Mar. 18, 2015

(65) Prior Publication Data
US 2015/0266562 A1   Sep. 24, 2015

(30) Foreign Application Priority Data

Mar. 21, 2014 (FR) ..................... 14 52376

(51) Int. Cl.
*B64C 9/16* (2006.01)
*B64C 9/02* (2006.01)

(52) U.S. Cl.
CPC . *B64C 9/16* (2013.01); *B64C 9/02* (2013.01)

(58) Field of Classification Search
CPC .................................... B64C 9/16; B64C 9/02
See application file for complete search history.

(56) References Cited

U.S. PATENT DOCUMENTS

| 2,284,519 | A | | 5/1942 | Hall | |
|---|---|---|---|---|---|
| 2,973,925 | A | * | 3/1961 | Wiele | B64C 9/24 244/203 |
| 4,384,693 | A | | 5/1983 | Pauly et al. | |
| 4,576,347 | A | | 3/1986 | Opsahl | |
| 5,681,013 | A | * | 10/1997 | Rudolph | B64C 9/24 244/214 |
| 7,063,292 | B2 | * | 6/2006 | Perez-Sanchez | B64C 9/04 244/216 |

(Continued)

FOREIGN PATENT DOCUMENTS

| EP | 0 050 542 | 4/1982 |
|---|---|---|
| WO | WO 2008/129074 | 10/2008 |
| WO | WO 2009/136949 | 11/2009 |

OTHER PUBLICATIONS

French Search Report for Application No. 1452376 dated Nov. 28, 2014.

*Primary Examiner* — Justin Benedik
(74) *Attorney, Agent, or Firm* — Jenkins, Wilson, Taylor & Hunt, P.A.

(57) ABSTRACT

The support assembly comprises a fixing system which comprises a first connection rod which is connected via a first end to a support component and which is configured to generate a primary force path and a second connection rod which is connected via a first end to the support component and which is configured to generate a secondary force path, the fixing system further comprising a beam which is fixed to a structural component, the second end of the first connection rod and the second end of the second connection rod being connected to the beam, which is arranged so that the directions of the first and second connection rods are oriented in accordance with a plane substantially orthogonal to the plane of the support component.

8 Claims, 4 Drawing Sheets

(56) References Cited

U.S. PATENT DOCUMENTS

| | | | | |
|---|---|---|---|---|
| 7,484,694 B2* | 2/2009 | Perez-Sanchez | ......... | B64C 9/22 |
| | | | | 244/210 |
| 7,600,718 B2* | 10/2009 | Perez-Sanchez | ......... | B64C 9/16 |
| | | | | 244/215 |
| 7,861,978 B2* | 1/2011 | Holert | ....................... | B64C 9/16 |
| | | | | 244/215 |
| 8,302,913 B2* | 11/2012 | Schlipf | .................... | B64C 9/16 |
| | | | | 244/215 |
| 2005/0116114 A1* | 6/2005 | Aitchison | ............... | F01D 25/12 |
| | | | | 244/207 |
| 2005/0116115 A1* | 6/2005 | Perez-Sanchez | ......... | B64C 9/04 |
| | | | | 244/212 |
| 2009/0026317 A1 | 1/2009 | Coughlin | | |
| 2009/0218450 A1* | 9/2009 | McAlinden | ............... | B64C 9/02 |
| | | | | 244/90 R |
| 2009/0272853 A1* | 11/2009 | Raudszus | .................. | B64C 3/50 |
| | | | | 244/214 |

\* cited by examiner

SUPPORTING SET FOR A WING FLAP SYSTEM OF AN AIRCRAFT

CROSS-REFERENCE TO RELATED APPLICATION

This application claims priority to FR 14 52376 filed Mar. 21, 2014, the entire disclosure of which is incorporated by reference herein.

TECHNICAL FIELD

The disclosure herein relates to a support assembly for a wing flap system of an aircraft, in particular a transport airplane.

The term "wing flap system" is intended to refer to a flap which comprises a conventional assembly which enables the operation and in particular the deployment thereof, the flap being mounted on a wing of the aircraft.

BACKGROUND

A flap support system, for a wing flap system which is arranged close to the junction of a wing with respect to the fuselage, is generally connected to the fuselage in the region of the main landing gear bay of the aircraft.

It is known that the main landing gear bay of the MLGB type, in particular of a transport airplane, is generally located at the center of the fuselage, just behind the center wing box, and this bay is provided with a rear wall, perpendicular to the longitudinal axis of the aircraft.

In the context of the disclosure herein, the support assembly for such a wing flap system comprises a structural portion of the aircraft, in particular at least one portion of such a main landing gear bay, a support component of the flap system and a fixing system which is configured to fix the support component to the structural portion.

Since a flap system is a flight control member, the fixing of this system has to be of the "fail-safe" type. To this end, the fixing system comprises primary force paths, for normal operation (without malfunction) and associated secondary force paths for operation in the event of the failure of an associated primary force path.

More specifically, the fixing system comprises:
a first connection rod which is connected via a first end to the support component and via a second end to the structural component, this first connection rod being configured to generate a primary force path transversely relative to the center plane of the support component; and
a second connection rod which is also connected via a first end to the support component and via a second end to the structural component, this second connection rod being configured to generate a secondary force path transversely relative to the center plane of the support component.

These first and second connection rods are directed in accordance with the plane of the wall at the rear of the bay, in a direction substantially transverse relative to the plane of the support component, which allows them to withstand the transverse forces in an effective manner.

However, if the dimensions of the landing gear bay have to be larger, for example, in a different version of the aircraft, the wall is moved to the rear.

Therefore, in such a situation, since the flap system support component does not change position, the arrangement of the second end of the first and second connection rods in the region of the wall would bring about an inclination of the connection rods relative to the transverse direction (toward the rear). The first and second connection rods would have a large angle relative to the transverse direction, which would increase the forces to which they are subjected. Such an increase of the forces would make it necessary to reinforce the structure and to provide in particular larger fixing elements, which is not satisfactory in terms of mass, cost and spatial requirement in particular.

SUMMARY

An object of the disclosure herein is to overcome this disadvantage. It relates to a support assembly for a wing flap system of an aircraft, the support assembly comprising a structural component of the aircraft, in particular at least one portion of a landing gear bay, a flap system support component and a fixing system which is configured to fix the support component to the structural component, the support component having a generally substantially planar contour, the fixing system comprising:
a first connection rod which is connected directly via a first end to the support component, the first connection rod being configured to generate a primary force path transversely relative to a center plane of the support component; and
a second connection rod which is connected directly via a first end to the support component, the second connection rod being configured to generate a secondary force path transversely to the center plane of the support component.

According to the disclosure herein, the fixing system further comprises a beam which is associated with the structural component, a second end of the first connection rod and a second end of the second connection rod being connected to the beam, and the beam is arranged so that the directions of the first and second connection rods are oriented in accordance with a plane which is substantially orthogonal to the center plane of the support component. In this manner, as a result of the disclosure herein, the arrangement of the beam allows the second ends of the first and second connection rods to be connected (indirectly to the structural component via this beam) so that these first and second connection rods have a direction which substantially corresponds to a transverse direction (relative to the support component). As a result of this arrangement and this orientation, these connection rods, and in particular the first connection rod which creates a primary force path and which is therefore used during normal operation, are more effective against the forces than if they had a large angle with respect to the transverse direction, which allows the above-mentioned disadvantage to be overcome.

Furthermore, the support assembly may have the following features:
the beam comprises two substantially planar fittings, these two fittings being superimposed and fixed together;
the beam is produced in the form of an elongate plate which comprises longitudinally, at one side, a first portion via which it is fixed to the structural component and, at the other side, a second portion to which the second ends of the first and second connection rods are connected;
the beam is provided at the external faces thereof with reinforcement ribs;
the support assembly comprises one of the following connections with play:

the first end of the first connection rod is connected with play to the support component;

the second end of the first connection rod is connected with play to the beam;

the first end of the second connection rod is connected with play to the support component;

the second end of the second connection rod is connected with play to the beam.

Furthermore, in a preferred embodiment, the fixing system further comprises:

a primary gusset which is configured to connect the structural component and the support component to each other;

a secondary gusset which is configured to connect the structural component and the support component to each other; and a coupling which is configured to connect the structural component and the support component to each other.

Preferably, the secondary gusset is connected with play to the support component.

The disclosure herein also relates to an aircraft, in particular a transport airplane, which is provided with such a support assembly.

BRIEF DESCRIPTION OF THE DRAWINGS

The Figures will provide a good understanding of how the disclosure herein can be implemented. In these Figures, reference numerals which are identical refer to elements which are similar.

DETAILED DESCRIPTION

Figure 1:
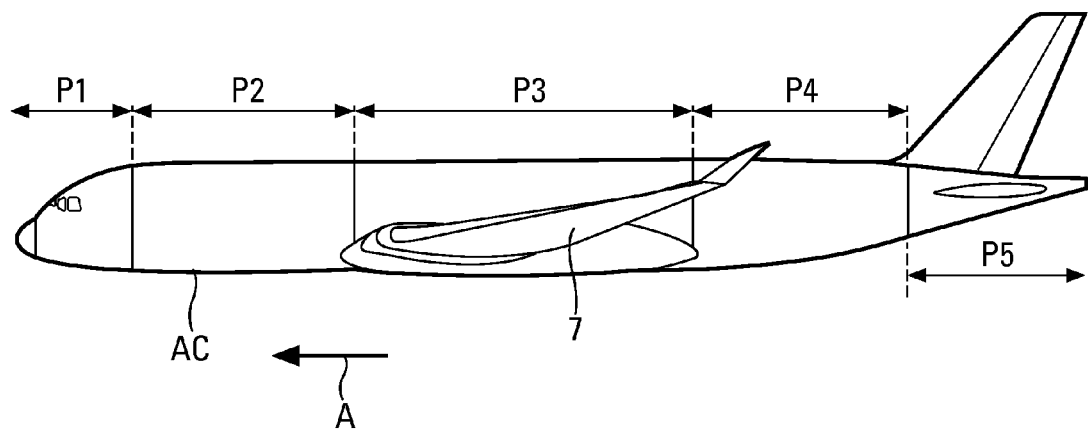
FIG. 1 is a schematic side view of an aircraft.
Figure 2:
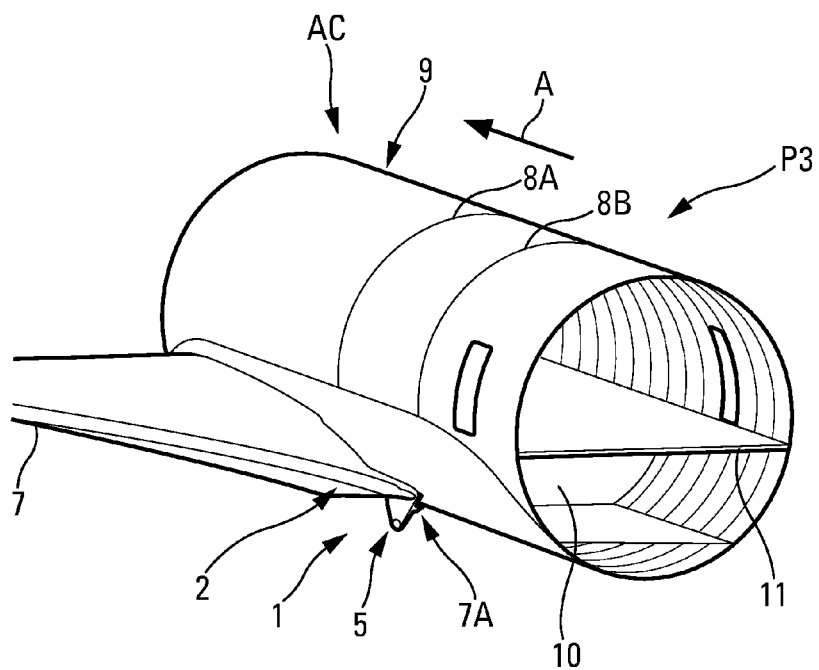
FIG. 2 is a schematic, perspective view of a central fuselage of the aircraft of FIG. 1.

The disclosure herein can be used for an aircraft AC, and in particular for a transport airplane, illustrated in FIG. 1 and (partially) in FIG. 2.

The example of FIG. 1 shows an aircraft AC in which different parts of the fuselage P1 to P5 are shown, and more specifically from the front to the rear:

a nose fuselage P1;

a front fuselage P2;

a central fuselage P3, which is illustrated in greater detail in FIG. 2;

a rear fuselage P4; and a rear cone P5.

In all of the description, the terms "front" and "rear" are intended to be considered in relation to an advance direction of the aircraft AC, this direction being indicated schematically by an arrow A in FIGS. 1 to 3, 5 and 6.

Figure 3:
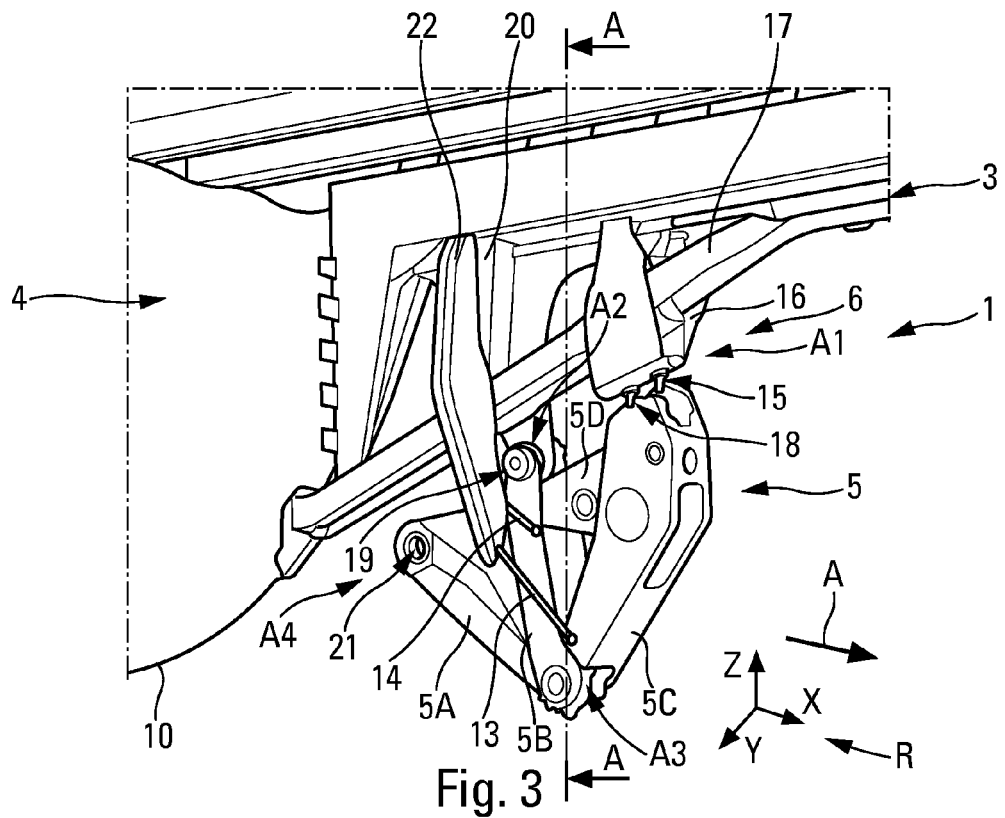
FIG. 3 is a perspective view of a support assembly which illustrates the disclosure herein.

The support assembly 1, which allows the disclosure herein to be set out and which is illustrated in FIG. 3, is a support assembly for a wing flap system (not illustrated) of the aircraft AC, but whose positioning on the aircraft AC is indicated by an arrow 2 in FIG. 2. This support assembly 1 comprises a structural component 3 of the aircraft AC, in particular at least a portion of a main landing gear bay 4, a support component 5 of the wing flap system and a fixing system 6 which is configured to fix the support component 5 to the structural component 3 of the aircraft AC.

As illustrated in FIG. 2, which is a schematic illustration of the central fuselage P3 and a portion of a left wing 7 of the aircraft AC, the support component 5 is arranged close to the junction 7A of the wing 7 with respect to the fuselage 9 in the region of the main landing gear bay 4 which is provided between two frames 8A and 8B of the fuselage 9 of the aircraft AC, only one rear wall 10 of this bay 4 being visible in this FIG. 2.

In conventional manner, this bay 4 is open toward the bottom of the aircraft AC and comprises at the rear the wall 10 illustrated in FIGS. 2 and 3.

In order to facilitate understanding, there is assigned to the support assembly 1 a reference system R (FIGS. 3 to 5) which has axes or directions X, Y and Z. It is considered that:

the direction X is a longitudinal direction, this direction X being parallel with a conventional longitudinal axis (not illustrated) of the aircraft AC and parallel with a central longitudinal direction of the bay 4;

the direction Z is a vertical direction which is orthogonal to the direction X, the plane XZ being parallel with a longitudinal/vertical plane of symmetry of the aircraft AC; and the direction Y is a transverse direction, the direction Y being orthogonal to the directions X and Z, the plane XY being a horizontal plane parallel with the plane of a floor 11 of the aircraft AC (FIG. 2).

Figure 4:
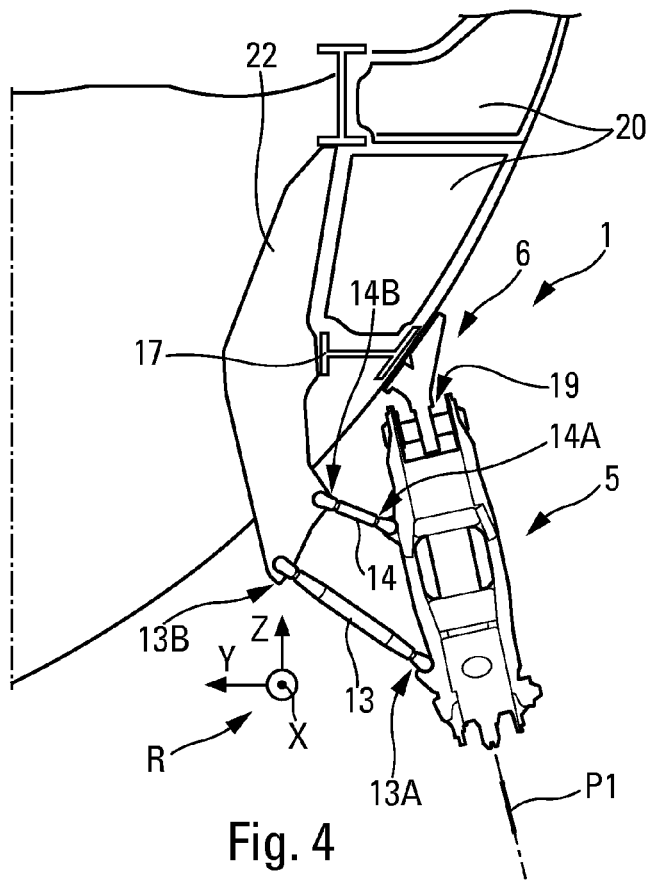
FIG. 4 is an illustration showing a schematic view along the plane AA of the support assembly of FIG. 3.

Furthermore, the support component 5, formed by a plurality of components 5A to 5D which are connected to each other, has a contour in the plane YZ which has a generally substantially planar shape. The support component 5 is arranged so that the center plane P1 of this contour is a "vertical" plane which is slightly inclined relative to the plane XZ (as shown in FIG. 4). The support component 5 has in the plane XZ a substantially triangular shape (which has respective tips A1, A3 and A4 and a mean perpendicular A2 of which originates from A3), a base A4A1 of which (in the region of the component 5D) is directed upward (in the direction Z), as illustrated in FIG. 3.

The support component 5 is fixed to the structural component 3 via the fixing system 6 substantially in the region of the front tip A1 and the mean perpendicular A2 and the tip A3 opposite the base A4A1.

To this end, the fixing system 6 comprises, as illustrated in FIGS. 3 and 4:

a first connection rod 13 which is articulated (in conventional manner) via a first end 13A to the support component 5 and which is capable of being connected via a second end 13B to the structural component 3. The connection rod 13 is configured to generate a primary force path transversely relative to the plane P1 of the support component 5; and a second connection rod 14 which is articulated (in conventional manner) via a first end 14A to the support component 5 and which is capable of being connected via a second end 14B to the structural component 3. The second connection rod 14 is configured to generate a secondary force path transversely relative to the plane P1 of the support component 5.

The primary force path is subjected to forces during normal operation (without malfunction), and the secondary force path is subjected to forces only in the event of a malfunction of the primary force path.

The fixing system 6 further comprises, as illustrated in FIG. 3:
- a connection component 16 which is generally produced in the form of a caliper and which is mounted on a beam 17 of the structural component 3;
- a primary gusset 15 and a secondary gusset 18 which are configured to connect the connection component 16 and the support component 5 to each other; and
- a coupling 19 which is articulated (in conventional manner) and which is configured to connect together a component 20 of the structural component 3 and the support component 5.

Furthermore, the flap (which is not illustrated) is connected to a rear end A4 of the upper edge of the support component 5. The flap is articulated, in conventional manner, in the region of a hole 21 which is formed in the support component 5, at this end A4.

According to the disclosure herein, the fixing system 6 further comprises a beam 22 which is fixed to the structural component 3. Furthermore:
- the end 13B of the connection rod 13 and the end 14B of the connection rod 14 are connected to the beam 22; and
- the beam 22 is arranged so that the directions of the connection rods 13 and 14 are substantially oriented in a plane which is orthogonal to the center plane P1 of the support component 5 and parallel with the transverse direction Y, as illustrated by a plane P2 in FIG. 6 (which also sets out a plurality of frames CA, CB, CD, CE of the fuselage 9 of the aircraft AC).

The beam 22 is connected to the support component 5 (via the connection rods 13 and 14) and it is fixed to the structural element 20 of the structural component 3. The ends 13B and 14B of the connection rods 13 and 14 are mounted in an articulated manner on the beam 22.

Figure 5:
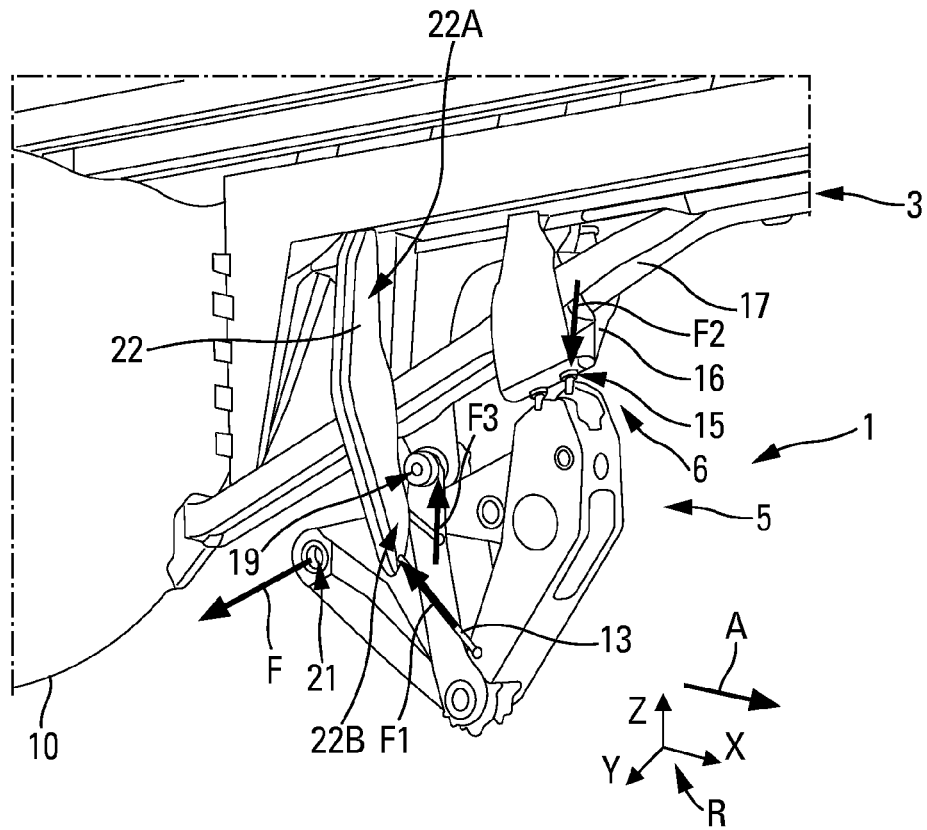
FIG. 5 is a view similar to that of FIG. 3, showing the forces applied in the region of a flap support component.
Figure 6:
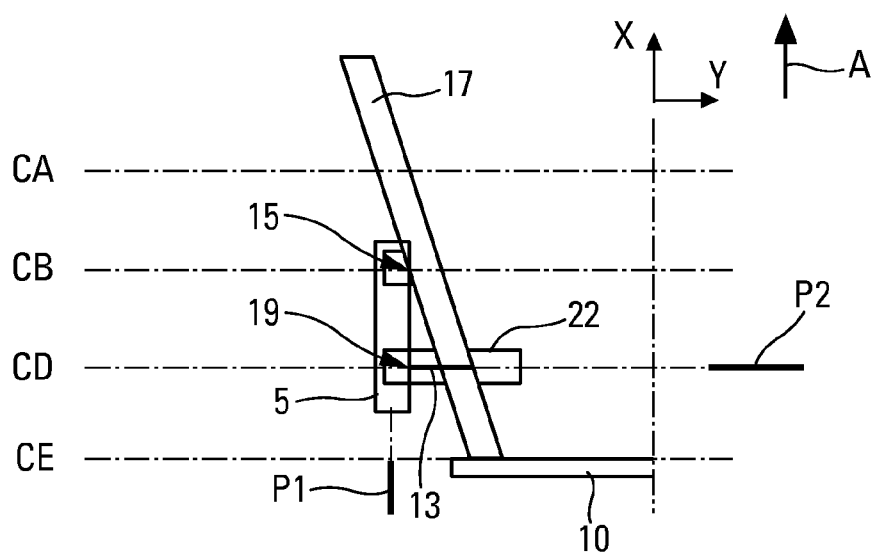
FIG. 6 is a diagram illustrating the arrangement between different elements of a support assembly.

FIG. 5 shows the different forces transmitted in the region of the support component 5 during normal operation (without any malfunction), that is to say:
- forces transmitted via the connection rod 13, as illustrated by an arrow F1;
- forces transmitted via the primary gusset 15, as illustrated by an arrow F2; and
- forces transmitted by the coupling 19, as illustrated by an arrow F3.

Furthermore, the arrow F (which is also indicated in FIG. 5) shows the forces originating from the flap (not illustrated) which is mounted in conventional manner on the support component 5 in the region of the hole 21.

In this manner, as a result of this arrangement of the beam 22, the ends 13B and 14B of the connection rods 13 and 14 are connected to the structural component 3 (indirectly via this beam 22) so that the connection rods 13 and 14 have a direction (in the plane XY) corresponding substantially to the transverse direction Y. As a result of this arrangement, these connection rods 13 and 14, and in particular the connection rod 13 which creates a primary force path and which is therefore used during normal operation, are more effective against the forces than if they had a large angle with respect to the transverse direction Y.

In a preferred embodiment, the beam 22 is produced in the form of an elongate plate (arranged substantially along the axis Z). This elongate plate comprises longitudinally at one side (upward along Z) a first portion 22A (FIGS. 5 and 8) via which it is fixed to the structural component 5 using conventional fixing structure (not illustrated) and at the other side (downward along Z) a second portion 22B to which the ends 13B and 14B of the connection rods 13 and 14 are connected.

Figure 8:
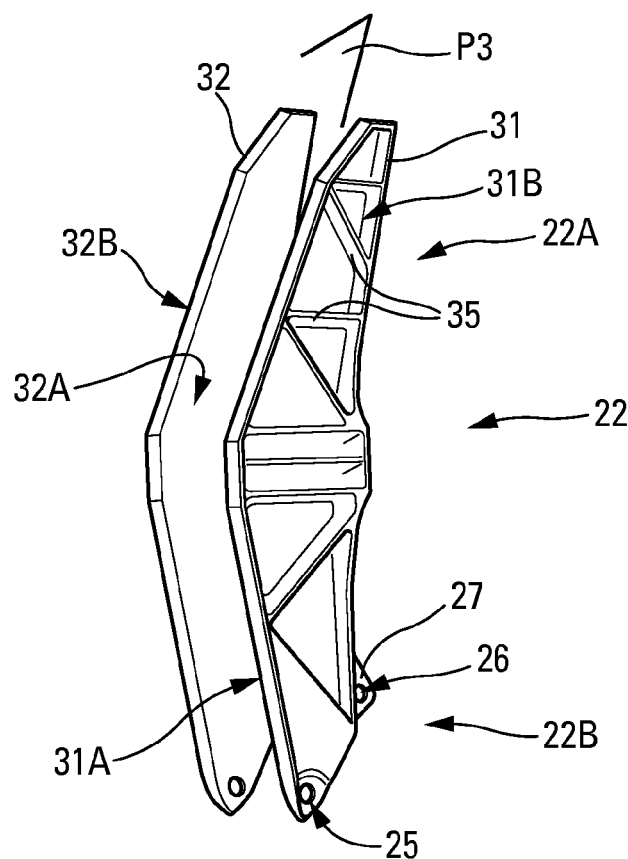
FIG. 8 is a slightly exploded view of a beam which forms a portion of a support assembly.

To this end, this second portion 22B comprises holes 25 and 26 which are suitable for enabling an articulated connection of the ends 13B and 14B of the connection rods, as illustrated in FIG. 8. The hole 25 is formed directly in the beam 22, and the hole 26 is formed in a lug 27 which is fixedly joined to the beam 22.

Furthermore, the secondary force path (created by the connection rod 14) is produced so as to be operable only in the event of a failure occurring on the primary force path created by the connection rod 13. To this end, the end 14B of the connection rod 14 comprises an axis 28 which extends with play 29 through the hole 26 formed in the lug 27 of the beam 22, as illustrated in FIG. 7.

Figure 7:
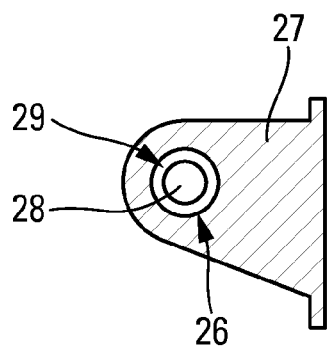
FIG. 7 is a schematic view of a connection with play for a secondary force path.

Furthermore, to the same end, the secondary gusset 18 (which is also intended to generate a secondary force path) is also connected with play to the support component 5 using a connection which is similar to that illustrated in FIG. 7.

Furthermore, as illustrated in FIG. 8, the beam 22 is constituted by two fittings 31 and 32. The duplication of the fittings is provided for safety reasons so that, in the event of breakage of one of the two fittings 31 and 32, the other can ensure the passage of the forces for at least a predetermined period of time.

Figure 9:
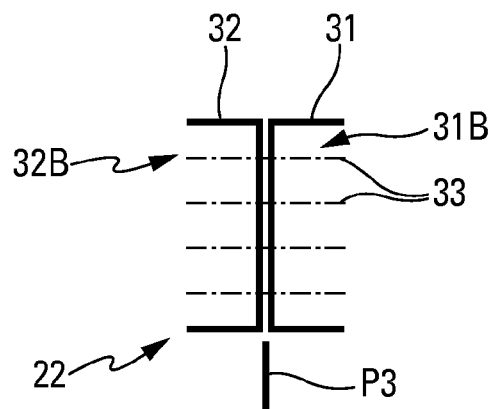
FIG. 9 is a diagram illustrating the connection of two fittings of a beam.

The two fittings 31 and 32 which are symmetrical relative to a center plane P3 are arranged in a superimposed manner, in contact with each other via planar rear faces 31A and 32A and are fixed via conventional structure (not illustrated), as illustrated by dot-dash lines 33 in FIG. 9.

Furthermore, the beam 22 is provided on the external faces (that is to say, on the external faces 31B and 32B of the fittings 31 and 32) with reinforcement ribs 35.

The support assembly 1, as described above, simultaneously has the following features:
- as a result of the arrangement along the plane P2, the ends 13A and 13B are capable of withstanding maximum forces;
- as a result in particular of the play 29, the secondary force path (created by the connection rod 14) is subjected to forces only when the primary force path (created by the connection rod 13) is broken; and
- as a result of the production of the beam 22 from two fittings 31 and 32 which are superimposed, the ends 13B and 14B are fixed to a structure having multiple force paths.

In this manner, the support assembly 1 complies with all of the conditions which a support assembly of a wing flap system must comply with and it can be adapted to different sizes of main landing gear bay 4.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A support assembly for a wing flap system of an aircraft, the support assembly comprising:
   a structural component of the aircraft,
   a flap system support component having a center plane which is inclined or substantially vertically oriented, and
   a fixing system configured to fix the support component to the structural component,
   wherein the support component comprises a substantially planar contour, and
   wherein the fixing system comprises:
      a first connection rod connected directly via a first end to the support component, the first connection rod being configured to generate a primary force path transverse to the center plane of the support component;
      a second connection rod connected directly via a first end to the support component, the second connection rod being configured to generate a secondary force path transverse to the center plane of the support component; and
      a beam associated with the structural component, a second end of the first connection rod and a second end of the second connection rod being connected to the beam, and
      wherein the beam is arranged so that directions of the first and second connection rods are oriented in substantially a same plane, this plane being substantially orthogonal to the center plane of the support component.

2. The support assembly according to claim 1, wherein the beam comprises two substantially planar fittings which are respectively superimposed and fixed together.

3. The support assembly according to claim 1, wherein the beam has a form of an elongated plate which comprises longitudinally, at one side, a first portion via which the beam is fixed to the structural component and, at another side, a second portion to which the second ends of the first and second connection rods are connected.

4. The support assembly according to claim 1, wherein external faces of the beam comprise reinforcement ribs.

5. The support assembly according to claim 1, further comprising at least one of the following:
   the first end of the first connection rod connected with play to the support component;
   the second end of the first connection rod connected with play to the beam;
   the first end of the second connection rod connected with play to the support component;
   the second end of the second connection rod connected with play to the beam.

6. The support assembly according to claim 1, wherein the fixing system further comprises:
   a primary gusset configured to connect the structural component and the support component to each other;
   a secondary gusset configured to connect the structural component and the support component to each other; and
   a coupling configured to connect the structural component and the support component to each other.

7. The support assembly according to claim 6, wherein the secondary gusset is connected with play to the support component.

8. An aircraft comprising at least one support assembly according to claim 1.

* * * * *